United States Patent
Chen et al.

(10) Patent No.: US 8,880,478 B2
(45) Date of Patent: Nov. 4, 2014

(54) SCAN-FREE ARCHIVING

(75) Inventors: Ying Chen, San Jose, CA (US); Chao Liu, Champaign, IL (US); Lesley Mbogo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 11/617,465

(22) Filed: Dec. 28, 2006

(65) Prior Publication Data
US 2008/0162601 A1    Jul. 3, 2008

(51) Int. Cl.
*G06F 17/30* (2006.01)

(52) U.S. Cl.
CPC .... *G06F 17/30073* (2013.01); *G06F 17/30144* (2013.01)
USPC .......................................................... 707/665

(58) Field of Classification Search
USPC .......................................................... 707/665
See application file for complete search history.

(56) References Cited

U.S. PATENT DOCUMENTS

| | | | |
|---|---|---|---|
| 5,410,667 A * | 4/1995 | Belsan et al. ................. | 711/114 |
| 5,638,508 A | 6/1997 | Kanai et al. | |
| 5,666,514 A * | 9/1997 | Cheriton ....................... | 711/144 |
| 5,778,395 A * | 7/1998 | Whiting et al. ............... | 707/204 |
| 6,289,379 B1 * | 9/2001 | Urano et al. .................. | 709/223 |
| 6,295,541 B1 * | 9/2001 | Bodnar et al. ................ | 707/203 |
| 6,401,084 B1 * | 6/2002 | Ortega et al. ................. | 707/706 |
| 6,850,962 B1 | 2/2005 | Povolny et al. | |
| 6,915,315 B2 | 7/2005 | Autrey et al. | |
| 7,814,078 B1 * | 10/2010 | Forman et al. ................ | 707/698 |
| 2002/0107877 A1 * | 8/2002 | Whiting et al. ............... | 707/204 |
| 2003/0028418 A1 * | 2/2003 | Yamaguchi et al. ............ | 705/10 |
| 2004/0015566 A1 * | 1/2004 | Anderson et al. ............. | 709/219 |
| 2004/0064488 A1 * | 4/2004 | Sinha ............................ | 707/204 |
| 2004/0193659 A1 * | 9/2004 | Carlson et al. ................ | 707/204 |
| 2004/0210608 A1 * | 10/2004 | Lee et al. ...................... | 707/204 |
| 2004/0250029 A1 * | 12/2004 | Ji et al. .......................... | 711/162 |
| 2004/0260976 A1 * | 12/2004 | Ji et al. .......................... | 714/31 |
| 2004/0268177 A1 * | 12/2004 | Ji et al. ............................ | 714/6 |
| 2005/0160427 A1 | 7/2005 | Ustaris | |
| 2005/0220279 A1 | 10/2005 | Schipper et al. | |
| 2010/0088354 A1 * | 4/2010 | Wu et al. ....................... | 707/827 |

* cited by examiner

*Primary Examiner* — Ajay Bhatia
*Assistant Examiner* — Kurt Mueller
(74) *Attorney, Agent, or Firm* — Scully, Scott, Murphy & Presser, P.C.

(57) ABSTRACT

A method is disclosed for archiving data in a storage server using a runtime monitoring system. The method includes providing a plurality of data files and creating access logs according to a specified format, which may include an append only access log, from the plurality of data files. At least one of the access logs from the plurality of data files is examined and a file will be archived from the examination of the access logs. An archive procedure is initiated for a file when the file has not been accessed for a specified period of time. If the file will be archived includes ascertaining if the file has a duplicate entry in the access log, and archiving the file when the file does not have the duplicate entry in the access log.

13 Claims, 1 Drawing Sheet

SCAN-FREE ARCHIVING

FIELD OF THE INVENTION

The invention relates to a method for archiving data, and more particularly, archiving data in a storage server using a runtime monitoring system.

BACKGROUND OF THE INVENTION

Current archiving methods archive files based on their respective last access times, i.e., a file "atime" (last time accessed). For example, a policy may be to archive all files that have not been accessed for more than "x" number of days. Traditional algorithms designed for such an archiving policy typically scan all files in the system on a regular basis, e.g., once per day, and check whether "x" days have passed since the last access for each file. Files that have not been accessed for at least "x" days will then be archived.

Generally, to archive a file if it has not been accessed for some time, requires an archiving module to gather the last file access time, i.e., atime, and the current time, to determine if an archiving criteria is met, such as, to archive when a file has not been accessed for a week. Thus, the atime of the file and the current time are used to make a determination of when the file was last accessed and if the file should be archived.

A disadvantage of typical algorithms used in archiving methods occurs because data has grown exponentially for many business making daily scans of entire file systems for archiving a non-viable solution to archiving needs. For example, millions of files can require hours to scan, leading to significant performance-intrusion to normal production workloads, even though typically, only a fraction of files need to be archived on each day. Scanning numerous files typically found at a business raises issues pertaining to cost, performance, reliability, and availability. Cost-effective information management, including archiving, throughout the information's lifecycle can be of critical importance to a company. Archiving is prominent in the domain of Information Lifecycle Management (ILM).

One solution to managing abundant data is using a leveraging cost-effective tiered storage infrastructure e.g., high end or low end disk storage, where high end disk storage may be server hard drives and low end disk storage may be tapes using tape drives. However, the solutions to the problem of volumous data storage, as well as, accessing such data effectively and efficiently has been directed toward traditional archiving or Hierarchical Storage Management (HSM) technologies, which moves data across tiered storage.

Known, are archiving solutions that archive files based on the last access time of the file. However, the existing archiving technologies typically rely on regular and expensive data repositories or file system scans to determine the archiving candidate files. In typical customer environments, the high-end storage can often host several terabytes of data and the low-end tape storage can keep tens or hundreds of terabytes of data, sometimes even petabytes. A disadvantage of current archiving techniques includes the lack of an efficient technology, system or method for scanning numerous files for archiving and archiving selected files. The lack of such an efficient system or method in the art results in slow and performance intrusive archiving techniques.

It would therefore be desirable to avoid direct file set scans when extracting an atime (last time accessed) from the files and checking if a current time is later than the atime. It would also be desirable for an archiving solution to provide efficient archiving with less runtime performance interference. It further is desirable to provide a scalable and efficient archiving algorithm for large file sets.

SUMMARY OF THE INVENTION

In an aspect of the present invention a method for archiving data in a storage server is provided using a runtime monitoring system. The method includes providing a plurality of data files and creating access logs according to a specified format from the plurality of data files. At least one of the access logs from the plurality of data files is examined and a file will be archived from the examination of the access logs. An archive procedure is initiated for a file when the file has not been accessed for a specified period of time.

In a related aspect, the step of determining if the file will be archived includes ascertaining if the file has a duplicate entry in the access log, and archiving the file when the file does not have the duplicate entry in the access log.

In a related aspect, the specified format is an append only access log.

In a related aspect, the file is not archived if its access log has been examined within a specified time period.

In a related aspect, the plurality of data files are tracked as the data files are created, and the tracking of the plurality of data files may occur when the data files first enter a data storage system which may include a plurality of computer data storage elements.

In a related aspect, the method further includes the steps of determining when the access log is available and not available. When the access log is not available the plurality of data files are scanned to determine if the file will be archived, and the archive procedure is initiated for the file when the file has not been accessed for the specified period of time.

In another aspect according to the invention, a runtime monitoring system for archiving data in a storage server comprises a plurality of data files, and an access monitoring device for monitoring a users accessing of the data files and creating at least one access log according to a specified format from the plurality of data files. A monitoring daemon examines at least one of the access logs from the plurality of data files and determines if an accessed file will be archived from the examination of the at least one of the access logs. The monitoring daemon initiates an archive procedure for the accessed file when the accessed file has not been accessed for a specified period of time.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
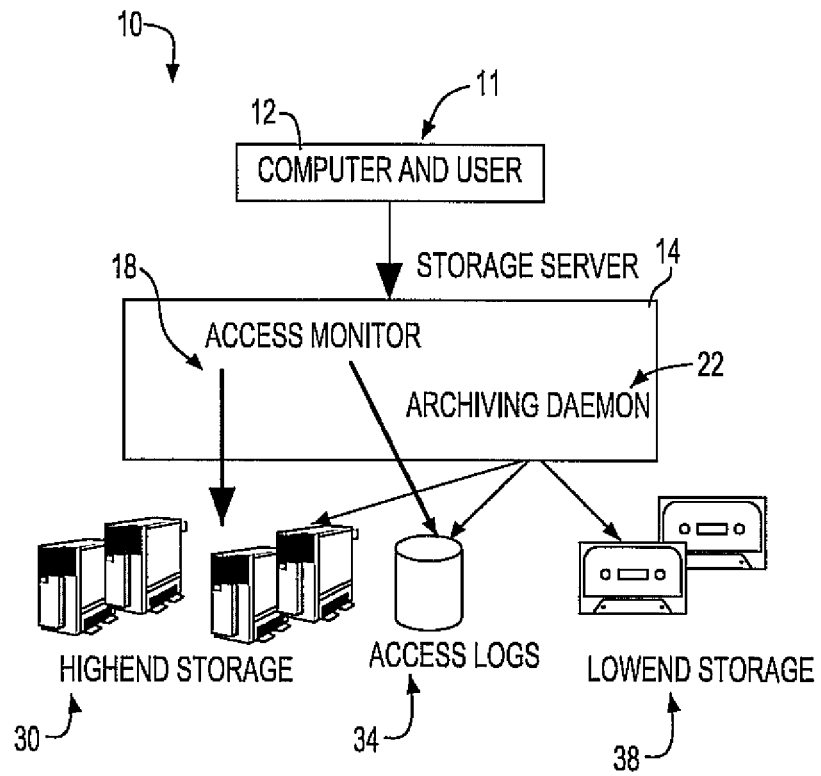
FIG. 1 is a diagram depicting an archiving system according to the present invention.

Referring to FIG. 1, an archiving system architecture according to an embodiment of the present invention comprises a runtime monitoring system 10 which includes an access monitor module 18 installed on the storage server 14, e.g., a file system server, and an archiving daemon 22. Users or administrators 11 are able to access the storage servers 14 and access local applications or host application on their individual nodes or computers 12. One computer and user system 11 is shown in FIG. 1 for illustrative purposes, however, it is understood that numerous users and computers are envisioned as accessing the storage servers 14. The storage servers 14 can access high-end storage, for example, hard drives on servers, and low-end storage 38, for example, tapes in a tape drive. The module 18 intercepts file accesses, i.e., reads files passed by the host applications to the storage servers and creates an access log file. Thus, the module 18 tracks a file access time "atimes" as they occur.

Figure 2:
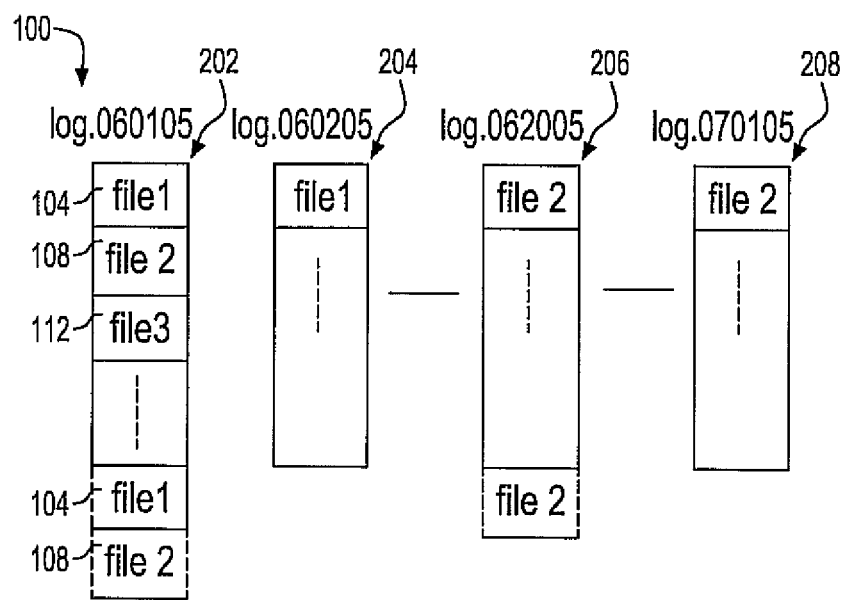
FIG. 2 is a block diagram of access logs shown in FIG. 1.

For each file access, the module 18 appends a record to an append-only log (for example, log 202 shown in FIG. 2). The record in the append-only log indicates that an access has occurred on the file. The append-only logs are allocated from the high-end storage space 30. Since no actual data is logged and only the un-archived files' access information is logged, the log space needed for the method according to the present invention is small. The monitor 18 can also bundle a large number of file accesses into a single large write to a disk log to minimize performance overhead.

An advantage of the present invention over conventional archiving algorithms is that the module 18 of the present invention tracks file atimes in the access log, and therefore does not have to regularly examine all files in an entire file set which can require significant processing time and resources. Thus, by tracking the file atimes as they occur, the method of the present invention avoids file set scans which would require extracting an atime and checking if a current time is later than the atime. Furthermore, archiving system module 18 efficiently identifies archiving candidates by using the access logs to identify the archiving candidates.

The archiving daemon 22 portion of the archiving system 10 installed on the storage server 14 can ran periodically, e.g., daily, or weekly. The daemon 22 examines the append-only access logs 34, determines which files to archive, and archives them accordingly. The archiving periodicity is a parameter which can be tuned or refined to archive files, for example, once every few hours, or once a day, or once a week. In the exemplary embodiment discussed below, a sample archiving policy is explained which archives all files which have not been accessed for at least "x" days. In practice, "x" is typically on the order of tens of days, e.g., 30 days. It is envisioned that if users wish to use smaller time units, e.g., hour or minute, instead of a day to define the archiving policy, the scan-free algorithm of the present invention can be easily modified to accommodate such requirements.

When the archiving unit is, for example, a day, the archiving daemon 22 can be invoked once a day to extract the files that have become qualified for archiving on that day and archive them accordingly. The invocation interval or the archiving interval defines the time between two successive archiving daemon invocations. An archiving interval can be larger than the archiving unit itself, e.g., a multiple of archiving units such as "n" days. In such cases, the archiving daemon is invoked once every "n" days. In general, files that have not been accessed for the last x+n, x+n−1, . . . , x+1, and x days can all be archived by the time the archiving daemon is invoked. When n>0, multiple days of accessed files may be batched together. The archiving daemon may delay archiving of some of the qualified files. For instance, when n=2, the archiving daemon is invoked once every 2 days. When the archiving daemon is invoked, there may be files that have not been accessed for x+1 and x days. The archiving daemon can archive all such files at one time. However, if n=0, there will be only files that have not been accessed for x days. Clearly, a small "n" ensures that the archiving is done more precisely and timely. A large "n" may delay archiving of old files that are no longer needed. Without archiving them away promptly, they can take up valuable space in high-end storage for unnecessary amounts of time, which also leads to suboptimal resource utilization.

The described archiving architecture/runtime monitoring system 10 according to the present invention includes monitoring and archiving. Both monitoring and archiving incur performance overheads. Monitoring is directed to how to efficiently track the file access information to facilitate the archiving candidate file identification. Archiving is directed to how to utilize the tracked file access information to identify the candidate files efficiently.

A preferred embodiment of the archiving method according to the present invention includes an append-only update archiving method to logically remove the log records from the logs as needed. Specifically, if a file "F" is accessed on day "i" and "k", where "k" is the most current day, i.e., (k>i), a log record for "F" is simply appended to the end of the log $L_i$, hence the name "append-only update". Later, when the archiving daemon examines log $L_i$ to identify candidate files for archiving, the archiving daemon knows that all files that have duplicate log record entries cannot be archived, since they must have been accessed on an later day. Thus, only the files that do not have duplicate entries can be archived, since they must have not been accessed for the last "x" days.

The append-only update method described above avoids scanning either the access logs or file systems. Furthermore, the monitor 18 can batch multiple updates to the same log into one append by first sorting the log records by their old atimes, and then updating all records that belong in the same log at once. This further improves the monitoring performance.

An exemplary append only update method is shown in FIG. 2. The log memory 100 includes log 060105 (202), log 060205 (204), log 062005 (206), and log 070105 (208). Log 202 includes files 1-3, 104, 108, and 112, respectively. To archive the files, the archiving daemon 22 can read the entire log in memory 100, filter out the duplicate file entries file 1 and file 2, 104 and 108, respectively, and then archive the remaining file entries. Using the append-only update method, duplicate file records may be seen in each log $L_i$. However, there cannot be more than two records for each file. This is because if a file is accessed on day "i" and a later day "j", there must be a new file record created in log $L_j$. For subsequent access to the same file, only log $L_j$ will be updated, but not $L_i$. If the original log size for $L_i$ is "s" when $L_i$ was initially created, then the maximum size for log $L_i$ is 2×s. This case may happen when all files accessed on day "i" were accessed on a later day before they are archived.

Depending on the available memory space, the archiving daemon may or may not be able to read the entire log $L_i$ into memory at once for processing because each of such logs can be tens or hundreds of MBs. If the memory space is not large enough to hold the entire log, the archiving daemon can divide the log into pieces and work on one piece at a time.

For each piece, the archiving daemon checks if all the file records have duplicate entries in the file records which are already read, if not, the file can be archived. Additional optimizations are possible to work with even smaller memory spaces by converting filenames into hash values rather than using absolute filenames. A hash function can use, for example, substitution or transposition of data to create a fingerprint, i.e., a hash value, which can be represented as a short string of random-looking letters and numbers.

For example, if the storage server has enough memory space for log processing, the append-only update will not need to break the log into multiple smaller pieces. For an append-only update, the monitoring costs include a new log write and appending to the "N" old logs if "N" files must be updated. Unlike the method of the present invention, traditional archiving incurs significant amount of random disk I/Os (input/output) simply to identify archiving file candidates. The append-only update incurs significantly less overhead because the monitor and archiving only needs to update logs and process them once a day.

In one scenario, an access buffer may be lost due to a storage server crash, which raises an issue of crash recovery. In the present invention, access logs may be buffered and the writes to the access logs are delayed. Thus, if there is a crash during the day, the entire buffer may be lost. This would result in the loss of the file accesses which occurred on that day, resulting in the archiving daemon not archiving all files that are qualified for the specified conditions. This problem may be resolved by having a separate daemon to scan the entire file system periodically, or initiating the entire file system scan after the access logs are found to be unavailable to retrieve the files that were missed from a normal archiving invocation due to the loss of an access buffer.

Thus, the append-only access log structure for tracking file accesses according to the present invention discloses an efficient and highly scalable archiving method, that archives files without expensive file system scans. The present invention introduces little runtime overhead for normal accesses while significantly reducing the archiving time because of the append-only access log structure for tracking file accesses and a runtime monitoring mechanism that tracks the file accesses as they occur.

Another technique to minimize runtime overhead may include merging into a single file multiple accesses which occurred on the same file during a time delay. The time delay is incurred while the access monitor delayed the writing of log records for accessed files by using a memory access buffer.

Another method according to the present invention includes avoiding log scans by keeping the access log records in the access log up-to-date. For example, if a file "F" is accessed on day one and day i (i>1), when day i's log record is written to the access log, the log record for F on day one can be logically removed from the log because the file was accessed after day one. Thus, the access log will contain only one access log record per file, and when the archiving daemon is invoked on, for example, the last day of the month, the portion of access log for day one will only contain the log records for files that have not been accessed for the month. All other files should have been logically deleted as they are accessed later on in the month. Using this method, there are only unique file records in the log.

Another method for archiving includes sequential log sequencing. Since the access records are typically bundled into large writes, the monitor creates one access log for each log write. The access logs also have a special naming scheme to allow the archiving daemon to easily identify them without searching through the entire log directory. For instance, if a log is created daily, the log name can be constructed as "log-.date" where "date" indicates the date on which the log is created. This is effectively creating a log deliminator that separate one day's log from another. As shown in FIG. 2, the logs have different log names 202-208 to indicate different days logs. Any delimitation scheme may be used as long as the monitor and archiving daemon can identify the desired portions of the access log, e.g., for a particular day.

To avoid scanning the access logs, the access monitor keeps track of an additional piece of information in memory as each file is accessed. That is, when a file "F" is accessed, the monitor records the last atime before the atime is updated to the current access time. The old atime indicates when "F" was accessed last. Such information allows the monitor to easily compute which access log would contain a record for "F" and hence needs to be updated. Specifically, if the last atime was "n" days ago, the access log that was created "n" days ago must contain a log record for "F". That record can now be removed since more recent accesses of the file F have occurred after that day. The old atime can be extracted without any additional overhead when the atime field is updated.

Thus, when the monitor is about to write out the entire access record buffer to a new access log "k", for each file record in the buffer, it checks its old atime and determines if the file was accessed on an earlier day based on that atime. If so, the corresponding log should be updated, otherwise, only a new log record will be written in the log created for day "k". Updating old access logs must be done with care to avoid a large number of random disk I/Os. In particular, the monitor can batch the updates to the same log $L_i$ together to avoiding multiple random updates to $L_i$.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for archiving data in a storage server using a runtime monitoring system, comprising:
providing a plurality of data files stored on a computer readable data storage device, the data storage device communicating with a computer;
reading file accesses using a module on the computer readable data storage device using the computer;
creating a plurality of access logs, each having a predetermined and individual time period;
defining a specified format for the plurality of access logs, the specified format comprising at least a last file access time (atime);
logging, using an appending update archiving method, read accesses of the plurality of data files in the plurality of access logs using the specified format for the access logs using the computer, the logging creating an access log record in one of the plurality of access logs having the predetermined time period corresponding to the atime of the read access;
examining the plurality of access logs from the plurality of data files using the computer;
determining if an accessed file will be archived from the examination of the plurality of access logs using the computer by:
ascertaining if the accessed file has more than one access log record in the plurality of access logs by examining the plurality of access logs; and
archiving the accessed file when the accessed file does not have more than one access log record in the plurality of access logs using the computer; and
initiating an archive procedure using the computer for the accessed file when the accessed file has not been accessed for a specified period of time.

2. The method of claim 1, wherein the plurality of data files are tracked as the data files are created by using the computer.

3. The method of claim 2, wherein the tracking of the plurality of data files occurs when the data files first enter a data storage system.

4. The method of claim 3, wherein the data storage system includes a plurality of computer data storage elements.

5. The method of claim 1, further including the steps of:
determining when the plurality of access logs are available and when the plurality of access logs are not available using the computer;
scanning the plurality of data files using the computer;
determining if the accessed file will be archived using the computer; and
initiating the archive procedure for the accessed file when the accessed file has not been accessed for the specified period of time using the computer.

6. A runtime monitoring system for archiving data in a storage server, which comprises:
a plurality of data files stored on a computer readable data storage device, the data storage device communicating with a computer;
an access monitoring device having a module on the computer readable data storage device and using the computer for monitoring a user's access of the data files, the module creating a plurality of access logs, each having a predetermined and individual time period, defining a specified format of a plurality of access logs, the specified format comprising at least a last file access time (atime), and the module using an appending update archiving method to log read accesses of the plurality of data files in the plurality of access logs, the logging creating an access log record in one of the plurality of access logs having the predetermined time period corresponding to the atime of the read access; and
a monitoring daemon stored in the data storage device and communicating with the computer, the monitoring daemon for:
examining the plurality of access logs from the plurality of data files; and
determining if an accessed file will be archived from the examination of the plurality of access logs by:
ascertaining if the accessed file has more than one access log record in the plurality of access logs by examining the plurality of access logs; and
archiving the accessed file when the accessed file does not have more than one access log record in the plurality of access logs; and
initiating an archive procedure using the computer for the accessed file when the access file has not been access for a specified period of time.

7. The method of claim 1, further comprising:
separating the plurality of access logs into specified access log files using the computer; and
identifying the plurality of access logs in each of the specified access log files using the computer.

8. The system of claim 6, wherein the specified format includes an append access log using an appending update archiving method, the appending update archiving method logically removes log records from the logs when a more recent log record is in the access log.

9. The system of claim 6, wherein the monitoring daemon reads an access log into memory to filter out duplicate file entries and archive remaining file entries.

10. The method of claim 1, further comprising:
reading an access log into memory;
filtering out duplicate file entries; and
archiving remaining file entries.

11. The method of claim 10, further comprising:
dividing one or more of the plurality of access logs into pieces; and
sequentially filtering out duplicate file entries for each of the pieces of the one or more access logs.

12. The method of claim 1, further comprising:
converting filenames of the plurality of data files into hash values.

13. The method of claim 1, further comprising:
creating a log deliminator for the plurality of access logs for separating a log from one day from another day's log.

* * * * *